(12) United States Patent
Tummalapenta et al.

(10) Patent No.: US 8,880,615 B2
(45) Date of Patent: Nov. 4, 2014

(54) MANAGING A WORKFLOW USING AN INSTANT MESSAGING SYSTEM TO GATHER TASK STATUS INFORMATION

(75) Inventors: Srinivas Babu Tummalapenta, Broomfield, CO (US); Marcus Ian Watkins, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 1929 days.

(21) Appl. No.: 11/611,450

(22) Filed: Dec. 15, 2006

(65) Prior Publication Data

US 2008/0147774 A1 Jun. 19, 2008

(51) Int. Cl.
 *G06F 15/16* (2006.01)
 *G06Q 10/00* (2012.01)
 *G06Q 10/06* (2012.01)
 *H04L 12/58* (2006.01)

(52) U.S. Cl.
 CPC ............. *G06Q 10/06* (2013.01); *H04L 51/046* (2013.01); *H04L 51/18* (2013.01); *H04L 51/34* (2013.01); *H04L 51/04* (2013.01); *H04L 12/581* (2013.01); *H04L 12/5885* (2013.01)
 USPC ............ 709/206; 705/301; 709/201; 709/207

(58) Field of Classification Search
 CPC ....... H04L 51/046; H04L 51/18; H04L 51/34; H04L 51/04; H04L 12/581; H04L 12/5885; G06Q 10/06
 USPC ............................ 709/206, 201, 207; 705/301
 See application file for complete search history.

(56) References Cited

U.S. PATENT DOCUMENTS

| | | | | |
|---|---|---|---|---|
| 5,530,861 | A * | 6/1996 | Diamant et al. | 705/8 |
| 6,336,125 | B2 * | 1/2002 | Noda et al. | 715/246 |
| 6,732,364 | B1 | 5/2004 | Bhaskaran et al. | |
| 6,785,681 | B2 * | 8/2004 | Keskar et al. | 707/10 |
| 6,810,383 | B1 * | 10/2004 | Loveland | 705/9 |
| 6,938,048 | B1 * | 8/2005 | Jilk et al. | 707/102 |
| 6,944,622 | B1 * | 9/2005 | Mitchell et al. | 707/102 |
| 7,113,933 | B1 * | 9/2006 | Imholte | 707/1 |
| 7,263,183 | B1 * | 8/2007 | Klein et al. | 379/265.09 |
| 7,711,653 | B1 * | 5/2010 | Denham et al. | 705/304 |
| 7,734,491 | B2 * | 6/2010 | Kayahara et al. | 705/7.23 |
| 8,566,438 | B2 * | 10/2013 | Wisniewski et al. | 709/224 |
| 8,660,849 | B2 * | 2/2014 | Gruber et al. | 704/275 |
| 8,671,408 | B2 * | 3/2014 | Zimmet et al. | 718/100 |
| 2002/0062367 | A1 * | 5/2002 | Debber et al. | 709/224 |
| 2002/0065702 | A1 * | 5/2002 | Caulfield | 705/9 |
| 2002/0087382 | A1 * | 7/2002 | Tiburcio | 705/9 |
| 2004/0049543 | A1 * | 3/2004 | Kaminsky et al. | 709/204 |
| 2004/0054740 | A1 * | 3/2004 | Daigle et al. | 709/206 |

(Continued)

*Primary Examiner* — Daniel C Murray
(74) *Attorney, Agent, or Firm* — Schmeiser, Olsen & Watts;; Arthur J. Samodovitz

(57) ABSTRACT

A method and system for managing a workflow using instant messages to determine the statuses of interdependent tasks. First and second tasks of the workflow are determined to be interdependent, whereby the first task is required to be completed before the second task is started. After receiving a first instant message (IM) that responds to an IM-based first query requesting a status of the first task, the first IM is determined to include key word(s) indicating that the first task is completed. An IM-based second query requesting a status of the second task is sent. After receiving a second IM that responds to the second query, the second IM is determined to include the key word(s) indicating that the second task is completed.

13 Claims, 7 Drawing Sheets

(56) References Cited

U.S. PATENT DOCUMENTS

| | | | |
|---|---|---|---|
| 2004/0172222 A1 | 9/2004 | Simpson et al. | |
| 2004/0177271 A1 | 9/2004 | Arnold et al. | |
| 2004/0199572 A1* | 10/2004 | Hunt et al. | 709/201 |
| 2005/0028158 A1* | 2/2005 | Ferguson et al. | 718/100 |
| 2005/0055412 A1* | 3/2005 | Kaminsky et al. | 709/207 |
| 2005/0071435 A1* | 3/2005 | Karstens | 709/207 |
| 2005/0080848 A1* | 4/2005 | Shah | 709/204 |
| 2005/0114789 A1 | 5/2005 | Chang et al. | |
| 2005/0120108 A1* | 6/2005 | Wisniewski et al. | 709/224 |
| 2005/0198124 A1* | 9/2005 | McCarthy | 709/203 |
| 2005/0278189 A1 | 12/2005 | Mercadante et al. | |
| 2006/0143270 A1* | 6/2006 | Wodtke et al. | 709/206 |
| 2006/0167737 A1 | 7/2006 | Muller et al. | |
| 2006/0168582 A1 | 7/2006 | Muller et al. | |
| 2006/0241996 A1* | 10/2006 | Burger et al. | 705/9 |
| 2006/0282302 A1* | 12/2006 | Hussain | 705/9 |
| 2007/0002824 A1* | 1/2007 | Klug et al. | 370/351 |
| 2007/0043821 A1* | 2/2007 | Brumfield | 709/207 |
| 2007/0162318 A1* | 7/2007 | Bean et al. | 705/8 |
| 2007/0208816 A1* | 9/2007 | Baldwin et al. | 709/206 |
| 2007/0258576 A1* | 11/2007 | Klein et al. | 379/265.02 |
| 2007/0282657 A1* | 12/2007 | Hupfer et al. | 705/9 |
| 2007/0282660 A1* | 12/2007 | Forth | 705/9 |
| 2007/0299953 A1* | 12/2007 | Walker et al. | 709/223 |
| 2008/0091782 A1* | 4/2008 | Jakobson | 709/206 |
| 2008/0103862 A1* | 5/2008 | Moss et al. | 705/8 |
| 2008/0120164 A1* | 5/2008 | Hassler | 705/9 |
| 2008/0155042 A1* | 6/2008 | Heinle et al. | 709/206 |
| 2008/0163214 A1* | 7/2008 | Rogers | 718/100 |
| 2008/0209417 A1* | 8/2008 | Jakobson | 718/100 |
| 2008/0301296 A1* | 12/2008 | York | 709/225 |
| 2008/0319829 A1* | 12/2008 | Hunt et al. | 705/10 |
| 2009/0006156 A1* | 1/2009 | Hunt et al. | 705/7 |
| 2009/0049131 A1* | 2/2009 | Lyle et al. | 709/206 |
| 2010/0057862 A1* | 3/2010 | Nicol et al. | 709/206 |
| 2010/0082755 A1* | 4/2010 | Bryan et al. | 709/206 |
| 2010/0082756 A1* | 4/2010 | Bryan et al. | 709/206 |
| 2010/0088391 A1* | 4/2010 | Brunswig et al. | 709/217 |
| 2010/0257526 A1* | 10/2010 | Zimmet et al. | 718/100 |

\* cited by examiner

MANAGING A WORKFLOW USING AN INSTANT MESSAGING SYSTEM TO GATHER TASK STATUS INFORMATION

FIELD OF THE INVENTION

The present invention relates to method and system for using an instant messaging system to gather information for a backend process, and more particularly to a technique for using an instant messaging system to gather information for a backend process that facilitates workflow management.

BACKGROUND OF THE INVENTION

In conventional workflow management processes that communicate information using automated email messages that require follow-up actions (e.g., visiting a web page, etc.) as responses to the automated processes, there is no reliable mechanism for closing the loop and determining that the target audience members have received and acted upon the messages in real time. Further, while email is a two-way medium, it is not a real-time medium. The email messages being used in known workflow management processes can be delayed by minutes, hours or even days without the sender knowing of the delay. Still further, using a return receipt for an email message is client-based and therefore is an unreliable approach for allowing the sender to determine that the email message has reached its destination. Thus, there exists a need to overcome at least one of the preceding deficiencies and limitations of the related art.

SUMMARY OF THE INVENTION

The present invention provides a method of using an instant messaging system to gather information for a backend process of a computing system. The information is accessible by a client computing unit of a set of client computing units. The set of client computing units are in communication via a network with an instant message server. The instant message server provides an instant messaging service to the set of client computing units. The method includes, for example, (1) automatically generating a query for information by the backend process, where the query is not initiated by any end user associated with any client computing unit, the backend process is an automated server process that is separate from the instant message server, and the backend process is not executing on any client computing unit; (2) sending a first instant message that includes the query from the backend process to a client computing unit of a set of client computing units via an instant message server; and (3) receiving, by the backend process in real-time and from the client computing unit via the instant message server, a second instant message that includes a final response to the query. The final response is either (a) the information or (b) a notification. In the case of (a), the information is placed in the second instant message (i) by an end user utilizing the client computing unit or (ii) by an automatic execution of a software agent residing on the client computing unit, where the automatic execution does not require an interaction with the client computing unit by any end user. In the case of (b), the notification does not include the information and indicates that the end user is not available to provide the information to the backend process.

Advantageously, the present invention leverages features of an instant messaging system to gather information for a backend process. The instant messaging system is leveraged by allowing an automated server process to initiate a query for information directed to an end user or to an automated agent residing on the end user's client computing unit. Further, the present invention facilitates workflow management by allowing a project manager to view receipt/response status in real time, including the actual status of the recipient (e.g., logged in, using the computer, offline, etc.). Still further, an end user can respond immediately to a query regarding the status of a task. Yet further, the present invention provides a lightweight system that allows users to easily dismiss workflow-related notifications and automatically reminds users who do not respond to workflow-related queries. Moreover, the information gathering system and method described herein can be used within a network managed by a single organizational entity (e.g., a corporate intranet), over two organizational entities connected through a secure network, or with users connected via the Internet.

DETAILED DESCRIPTION OF THE INVENTION

The present invention provides a method and system for using an instant messaging system to gather information proactively for a backend process, thereby closing the loop between successive operations and operators in a real time fashion. A query for the information is initiated by the backend process and sent in an instant message from the backend process to an end user's client computing unit, where an instant message that includes a response to the query is generated by the end user or by an automated software agent. The sending of the query for the information uses an instant message server as a front end. The query for information and the resulting response to the query do not use the human-to-human interaction that characterizes the exchange of free-form text in known instant messaging systems. Instead, the present invention uses instant messages that include predetermined, automated queries initiated by a non-human backend process and responses that conform to predefined rules.

As used herein, closing a loop is defined as ensuring that a system that initiates a process, task or project receives notification of, or is involved in determining, whether or not the process, task or project is completed. Closing a loop includes a verification step that determines if the process, task or project is completed.

Figure 1:
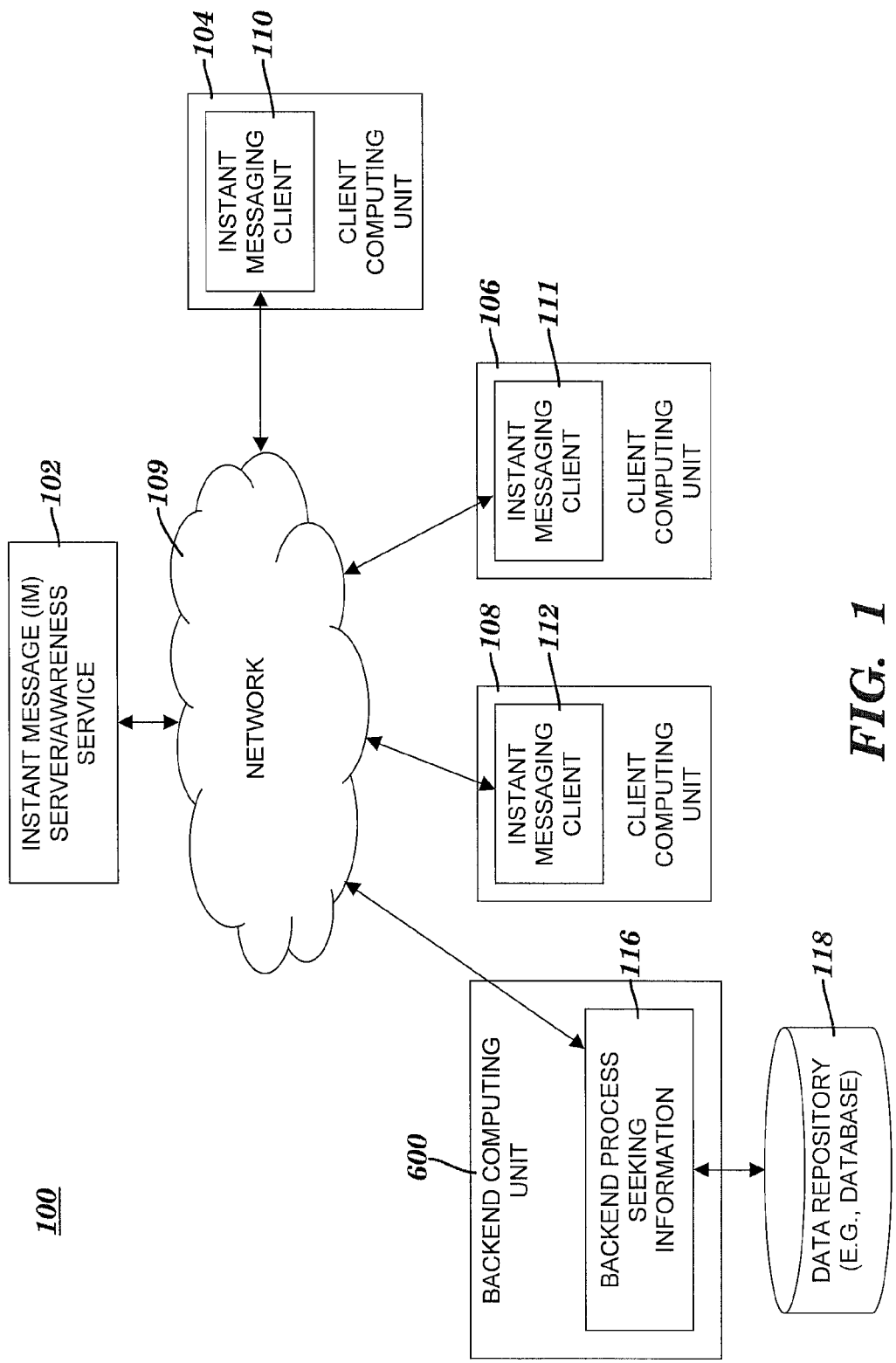
FIG. 1 is a block diagram of a system for using an instant messaging system to gather information for a backend process, in accordance with embodiments of the present invention.

FIG. 1 is a block diagram of a system for using an instant messaging system to gather information for a backend process, in accordance with embodiments of the present invention. System 100 includes an instant messaging (IM) server 102 in communication with a plurality of client computing units 104, 106, 108 via network 109. Instant messaging clients 110, 111, 112 executing on client computing units 104, 106, 108, respectively, are recipients of the IM service and awareness service provided by IM server 102.

System 100 also includes a backend computing unit 600 that executes a backend process 116 that is seeking information from one of the plurality of client computing units 104, 106, 108. As used herein, a backend process is defined as an automated server process that provides a central service to a plurality of users. A backend process provides its service without being part of a user interface, and is not part of any client computing unit. Backend process 116 is separate from instant messaging infrastructure that includes IM server 102. Backend process 116 initiates queries directed to end users and is at the end stage (i.e., backend) of receiving responses to the queries. The queries are for information that is accessible by client computing units. A query initiated by backend process 116 is responded to by an end user using a client computing unit or by an automated software agent residing on the client computing unit. In the communication of the response to the query, the instant messaging infrastructure acts as a front end (e.g., collecting input from the user or agent) that processes the information for use by backend process 116.

A data repository 118 (e.g., a database) is accessible by backend process 116 for storage of information gathered from the client computing units. Data stored in data repository 118 is used to support audit trails, derivation of metrics, and calculations of service levels, response times, completion times, etc. Backend computing unit is described in the discussion presented below relative to FIG. 6.

In one embodiment, the system of FIG. 1 is modified to include a plurality of different instant message servers (not shown) managed by different organizational entities, each instant message server providing an instant message service to its own set of client computing units via a network of a plurality of networks. The different instant message servers employ a protocol for interconnectivity so that, for example, a query initiated by backend process 116 is sent as an instant message to a first instant message server, then from the first instant message server to a second instant message server, and finally from the second instant message server to an IM client running on a client computing unit receiving the instant message service provided by the second instant message server. In this example, a response to the query is sent from the IM client that received the query to the second instant message server, then from the second instant message server to the first instant message server, and finally from the first instant message server to the backend process.

Information Gathering Via User-Provided Response

Figure 2:
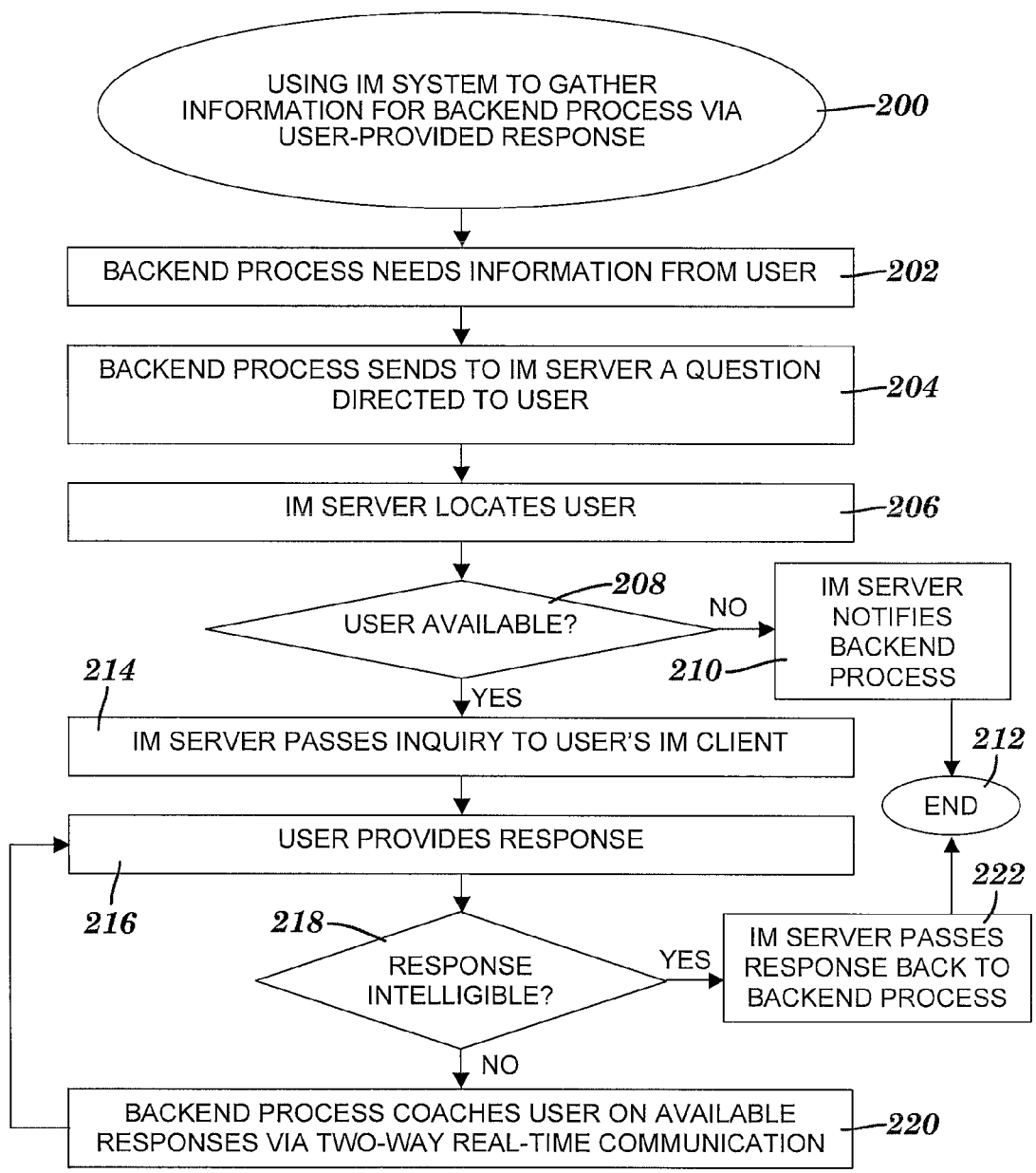
FIG. 2 is a flow diagram of a process for gathering information for a backend process via a user-provided response and using the system of FIG. 1, in accordance with embodiments of the present invention.

FIG. 2 is a flow diagram of a process for gathering information for a backend process via a user-provided response and using the system of FIG. 1, in accordance with embodiments of the present invention. The information gathering process of FIG. 2 begins at step 200. In step 202, backend process 116 (see FIG. 1) is running on backend computing unit 600 (see FIG. 1) and is seeking information to be provided by an end user of one of the plurality of client computing units 104, 106, 108 (see FIG. 1). In step 204, backend process 116 (see FIG. 1) sends to IM server 102 (see FIG. 1) an instant message that includes a query. The query sent in step 204 is for the information being sought by backend process 116 (see FIG. 1) in step 202 and is directed to the aforementioned end user. In step 206, IM server 102 (see FIG. 1) locates the end user. IM server 102 employs an awareness service to determine in inquiry step 208 whether the end user is available to provide the information sought by backend process 116 (see FIG. 1). The awareness service may indicate that the end user is unavailable by determining that the end user is, for example, not online, away from the client computing unit being used by the end user, in a meeting, or in a "do not disturb" mode. If IM server 102 (see FIG. 1) determines in inquiry step 208 that the end user is not available, then in step 210, IM server 102 (see FIG. 1) sends another instant message that includes a final response that notifies backend process 116 (see FIG. 1) of the end user's unavailability and the process of FIG. 2 ends at step 212.

If IM server 102 (see FIG. 1) determines in inquiry step 208 that the end user is available, then in step 214, IM server 102 (see FIG. 1) sends the query to an IM client executing on the client computing unit being used by the end user. In step 216, the end user provides a response (i.e., generates an instant message that includes a response to the query). IM server 102 (see FIG. 1) determines in inquiry step 218 whether the response included in the instant message generated in step 216 is intelligible based on predefined rules (e.g., determines if a response to a query regarding the status of a task includes the key word phrase "is complete"). If the response is determined to be intelligible in step 218, then in step 222, IM server 102 (see FIG. 1) sends the intelligible response as a final response included in an instant message to backend process 116 (see FIG. 1) and the process of FIG. 2 ends at step 212. The final response sent in step 222 includes the information sought by backend process 116 (see FIG. 1) in step 202.

If the response is determined to be unintelligible in step 218, then in step 220, backend process 116 (see FIG. 1) opens a two-way real-time communication with the end user to coach the end user on available responses that are deemed to be intelligible based on the aforementioned predefined rules. After the coaching of the end user in step 220 is complete, the process of FIG. 2 loops back to step 216 with the end user providing another response.

Example

The completion of project X has two dependencies: task A and task B. Task A must be completed before work can begin on task B. Bob is responsible for task A. Sally is responsible for task B. A portion of the project manager's actions that ensure that project X is completed is automated by backend process 116 (see FIG. 1). For instance, backend process 116 (see FIG. 1) notifies Bob in an instant message sent via an instant messaging application provided by IM server 102 (see FIG. 1) that task A needs to be completed. The sending of the instant message is initiated in step 204, Bob is determined to be available in step 208, and the instant message is sent to the IM client of Bob's client computing unit in step 214. Bob then responds to the instant message by sending another instant message in step 216. A sample of two instant messaging exchanges between the IM application and Bob is presented below:

Instant messaging application: "Bob, project X is currently waiting for you to complete task A. Please respond with 'complete' or 'remind in N days'"

Bob: "remind in 2 days"

Instant messaging application: "Thank you Bob. I will remind you again in 2 days. Are there any notes you would like to add to this response?"

Bob: "no"

Bob's responses of "remind in 2 days" and "no" are determined to be intelligible by step 218. These intelligible responses are sent by IM server 102 (see FIG. 1) to backend process 116 (see FIG. 1) in step 222. Two days later, Bob receives a reminder from the IM application via an instant message (see, e.g., steps 204 and 214). The instant messaging exchanges starting with the reminder is presented below:

Instant messaging application: "Bob, this is your reminder that project X is currently waiting for you to complete task A. Please respond with 'complete' or 'remind in N days'"

Bob: "complete"

Instant messaging application: "Thank you Bob. The next item is for Sally, and is task B. Are there any notes about task A that you would like to inform her of?"

Bob: "Sally, I had to make changes Y and Z to task A"

Instant messaging application: "Thanks, your comments have been recorded."

Bob's aforementioned response of "complete" is determined in step 218 to be an intelligible response and is sent by IM server 102 (see FIG. 1) to backend process 116 (see FIG. 1) in step 222. Backend process 116 (see FIG. 1) then notifies Sally with the following instant message sent via IM server 102 (see FIG. 1):

Instant messaging application: Sally, project X is currently waiting for you to complete task B. Please respond with 'complete' or 'remind in N days'"

In one example, the subsequent exchanges between the instant messaging application and Sally are analogous to the exchanges between the instant messaging application and Bob, which are presented above.

Information Gathering Via Agent-Provided Response

Figure 3:
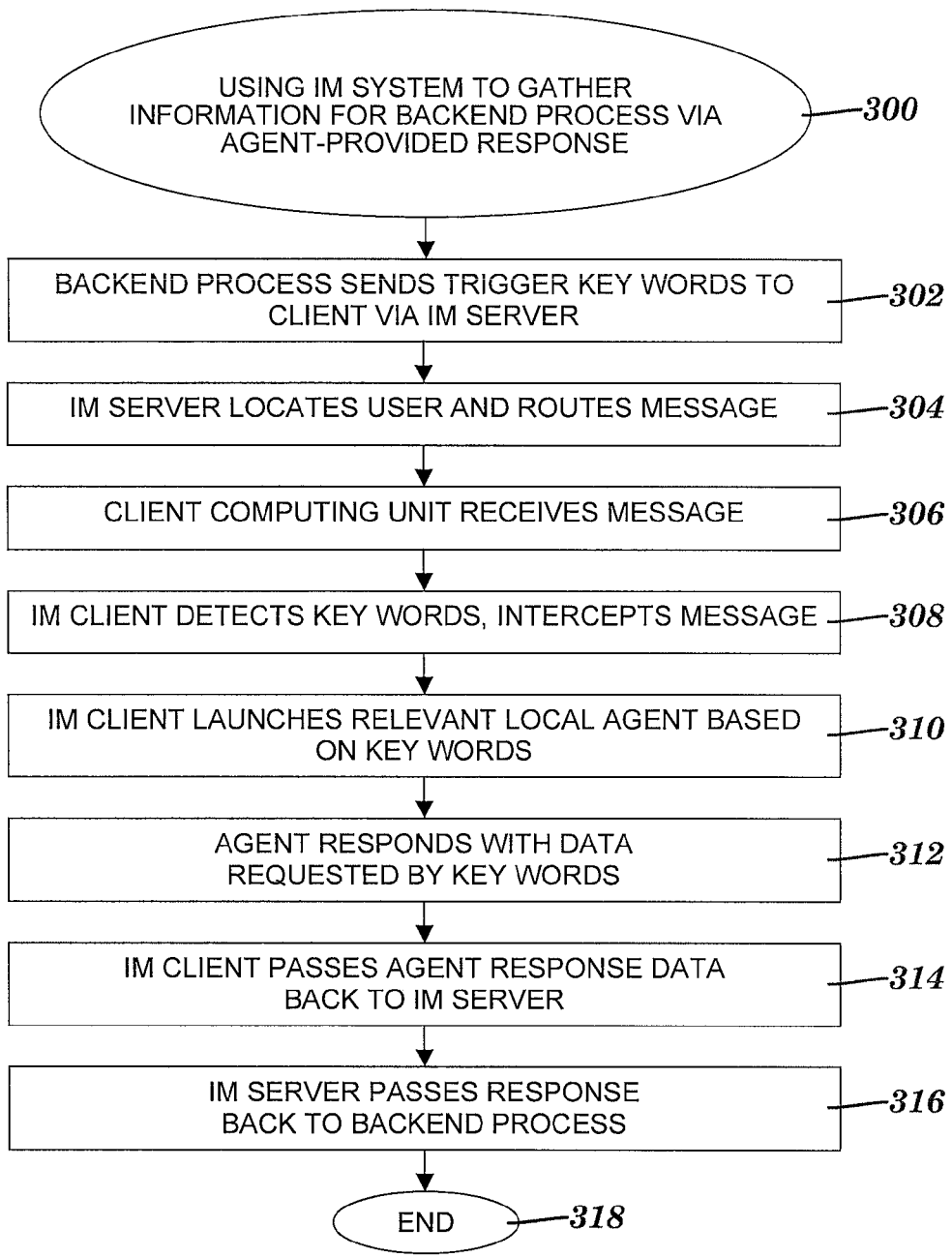
FIG. 3 is a flow diagram of a process for gathering information for a backend process via a software agent-provided response and using the system of FIG. 1, in accordance with embodiments of the present invention.

FIG. 3 is a flow diagram of a process for gathering information for a backend process via a software agent-provided response and using the system of FIG. 1, in accordance with embodiments of the present invention. The information gathering process of FIG. 3 begins at step 300. In step 302, backend process 116 (see FIG. 1) sends an instant message that includes a query for information being sought by the backend process, where the query is directed to an end user of client computing unit 104 (see FIG. 1) via IM server 102 (see FIG. 1). The query sent in step 302 includes trigger key words (i.e., key words that are capable of triggering a software agent). In step 304, IM server 102 (see FIG. 1) locates the end user and routes the query to the end user's client computing unit 104 (see FIG. 1). Client computing unit 104 (see FIG. 1) receives the query in step 306.

In step 308, IM client 110 (see FIG. 1) detects the key words included in the instant message sent in step 302 and intercepts the instant message. In step 310, IM client 110 (see FIG. 1) launches the relevant local software agent (i.e., the software agent that resides and runs on client computing unit 104 and that is associated by a set of predetermined rules with the trigger key words sent in step 302). In step 312, the software agent launched in step 310 locates the information sought by backend process 116 (see FIG. 1) and generates an instant message that includes a response to the query. The response included in the instant message generated in step 312 includes the information sought by backend process 116 (see FIG. 1). In step 314, IM client 110 (see FIG. 1) sends the instant message generated in step 312 (i.e., the instant message that includes the response to the query) to IM server 102 (see FIG. 1). In step 316, IM server 102 (see FIG. 1) sends the instant message generated in step 312 and the response included therein to backend process 116 (see FIG. 1). The information gathering process of FIG. 3 ends at step 318.

Information Gathering Facilitating Workflow Management

Figure 4:
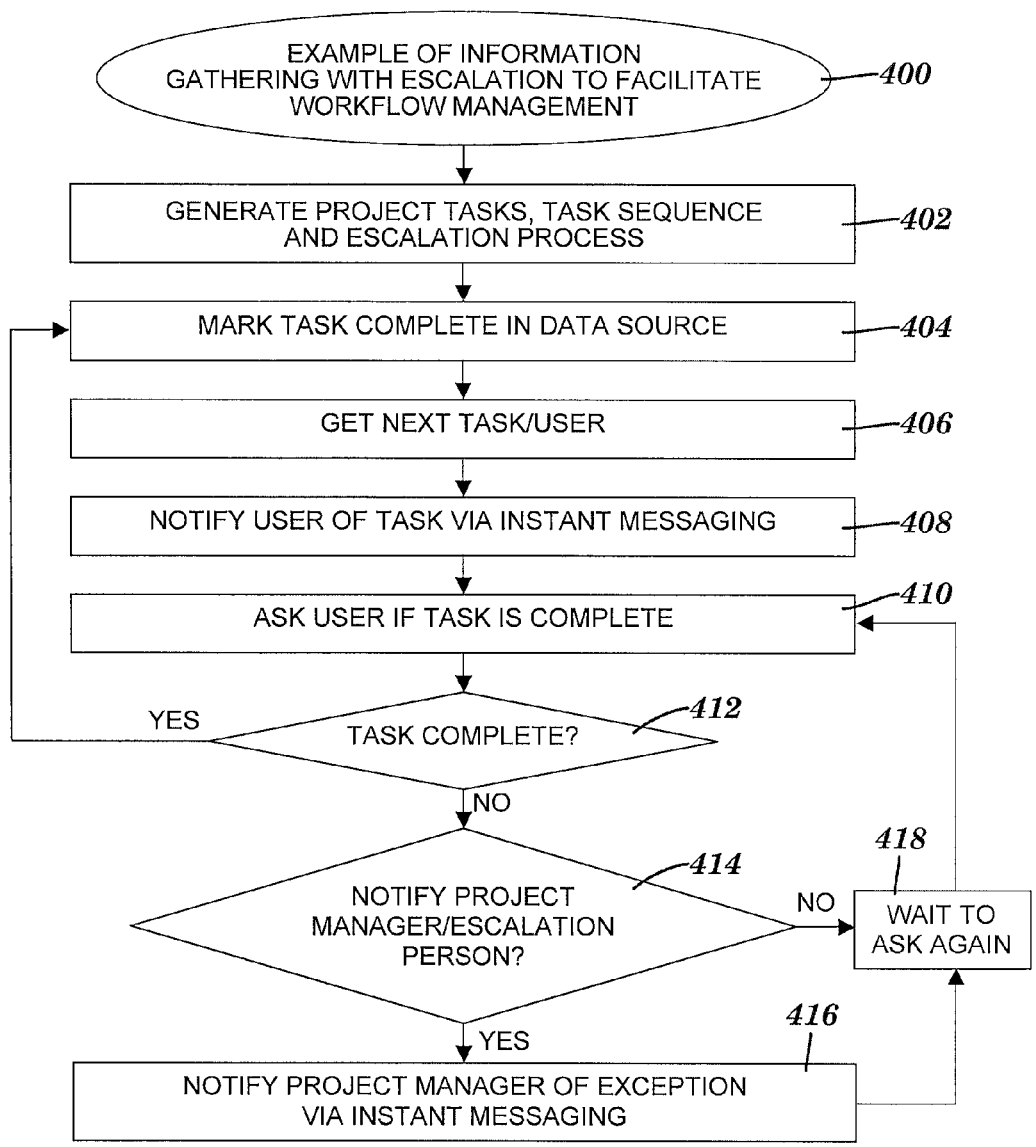
FIG. 4 is a flow diagram of a process of information gathering with escalation using the system of FIG. 1 to facilitate the management of a workflow, in accordance with embodiments of the present invention.

FIG. 4 is a flow diagram of a process of information gathering with escalation using the system of FIG. 1 to facilitate the management of a workflow, in accordance with embodiments of the present invention. The information gathering process of FIG. 4 begins at step 400. In step 402, backend process 116 (see FIG. 1) generates tasks that are included in a project, the sequence of the tasks in the project, and an escalation process that includes the rules that determine the conditions under which a project manager or other escalation person is notified if a task is incomplete.

As used herein, escalation is defined as a notification and request for action from a person (a.k.a. escalation person) other that the person (a.k.a. task owner) responsible for completing a task in a workflow, where the notification is provided in response to a non-completion of the task in the task's assigned timeframe or an absence of a response from the task owner within a predetermined time period. For example, if a task owner does not respond to a query about the status of a task within a predetermined time period, a computing system performs escalation by notifying the task owner's manager of the non-response and requesting that the manager contact the task owner.

In step 404, backend process 116 (see FIG. 1) indicates that a task of the project is complete by marking the task in data repository 118 (see FIG. 1). In step 406, backend process 116 (see FIG. 1) obtains from data repository 118 (see FIG. 1) the next task in the task sequence and the user who is responsible for completing the obtained task. In step 408, backend process 116 (see FIG. 1) generates and sends an instant message that includes a query directed to the user who is responsible for completing the task obtained in step 406. In step 410, the query included in the instant message generated in step 408 asks the user if the task obtained in step 406 is complete. If the task is complete as determined by backend process 116 (see FIG. 1) in step 412 (e.g., the user's instant message response to the query is "complete"), then the process of FIG. 4 loops back to step 404. Although not shown in FIG. 4, when an iteration of the loop starting at step 404 determines in step 406 that no other tasks remain to be obtained, the process of FIG. 4 ends.

As used herein, workflow is defined as a sequence of predetermined tasks required to complete a project. The sequence of predetermined tasks includes task attributes that determine, for example, task interdependencies, the persons who perform the tasks, the timeframes allotted to the tasks, the resources assigned to the tasks, the relative order of the tasks, and/or the synchronization of the tasks. One example of a workflow is a sequence for completing a project in which task A must be completed before task B.

If backend process 116 (see FIG. 1) determines that the task obtained in 406 is not complete and a predetermined time period is expired, then the rules generated in step 402 are consulted by backend process 116 (see FIG. 1) in inquiry step 414. If backend process 116 (see FIG. 1) determines that the aforementioned rules indicate that a project manager or another escalation person is to be notified of the incomplete task, then in step 416, backend process 116 (see FIG. 1) sends an instant message that includes a notification. The notification informs the project manager or another escalation person of the incomplete task. A predefined period of waiting time in step 418 is subsequent to step 416 and subsequent to backend process 116 (see FIG. 1) determining in step 414 that the project manager or escalation person is not to be notified of the incomplete task. After the predefined waiting time period in step 418, the process of FIG. 4 loops back to step 410.

In one embodiment, the inquiry in step 412 determines if the user to whom the instant message is sent in step 410 responds to the instant message query regarding the status of the task. If step 412 determines that the user does not respond to the query, then inquiry step 414 determines whether the duration of the non-responsiveness of the user has exceeded a predetermined time interval, thereby requiring an escalation. If the predetermined time interval has been exceeded, the escalation occurring in step 416 includes sending additional instant message queries regarding the task status to the same user and looping back to step 410 via step 418. If the user is online as determined by the awareness service of IM server 102 (see FIG. 1), but does not respond to an additional instant message as determined by step 412, then the frequency of subsequent instant messages is increased.

The sample exchange in the section entitled "Example" can be applied to the process of FIG. 4. The initial instant message inquiry by the instant messaging application about task A's status corresponds to steps 408 and 410. Bob's first response (i.e., "remind in 2 days") causes the process of FIG. 4 to proceed over the No branches of steps 412 and 414. After waiting for two days in step 418, the process loops back to step 410 with the instant messaging application sending the reminder (i.e., "Bob, this is your reminder . . . "). Bob's response to the reminder (i.e., "complete") causes the process of FIG. 4 to proceed over the Yes branch of step 412 (i.e., task A is complete), task A is marked complete in step 404, and the next user, Sally, is determined in step 406. The instant message inquiry about task B's status directed to Sally by the instant messaging application again corresponds to steps 408 and 410.

Figure 5A:
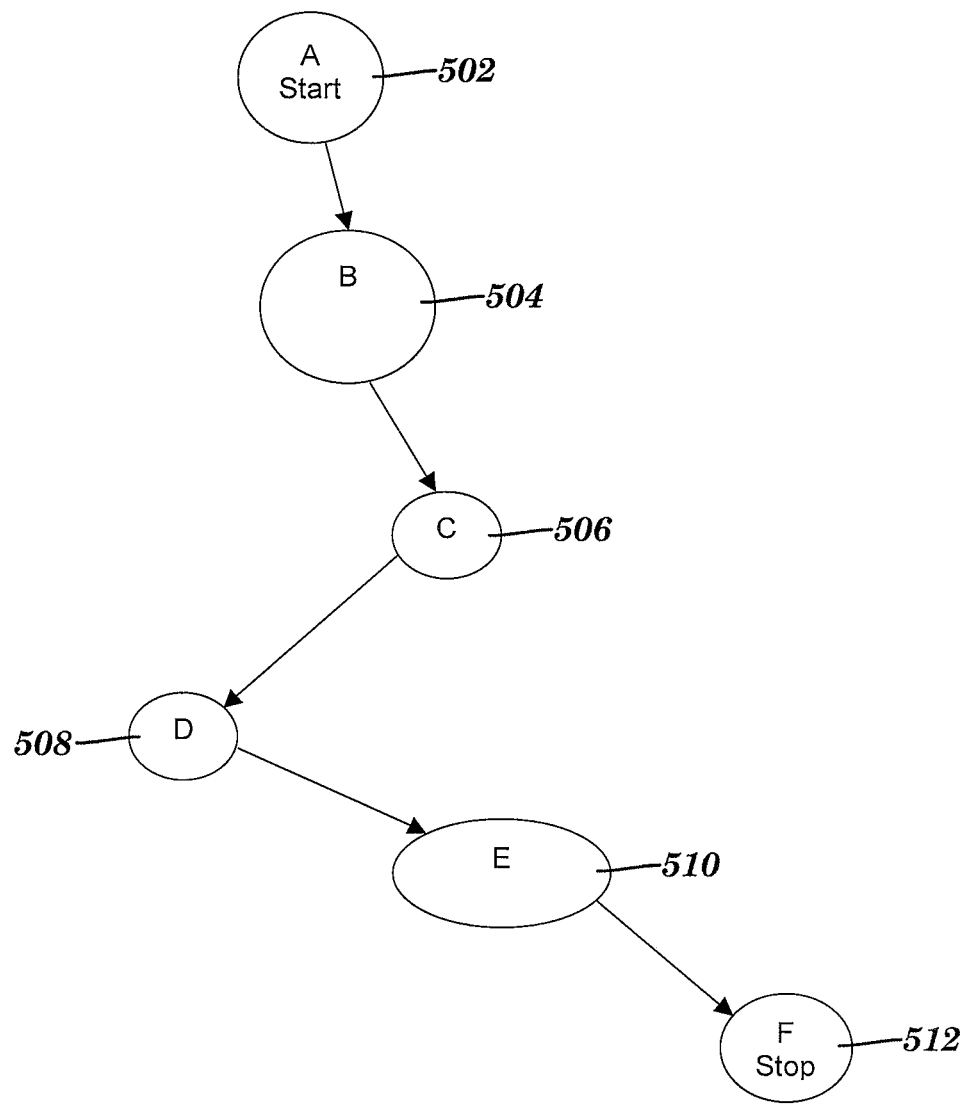
FIG. 5A depicts an example of a one-to-one dependency task thread of a workflow whose management is facilitated by the system of FIG. 1 and at least one of the processes of FIGS. 2-4, in accordance with embodiments of the present invention.

FIG. 5A depicts an example of a one-to-one dependency task thread of a workflow whose management is facilitated by the system of FIG. 1 and at least one of the processes of FIGS. 2-4 in accordance with embodiments of the present invention. Task thread 500 includes predefined tasks 502, 504, 506, 508, 510 and 512, which are also labeled as tasks A, B, C, D, E and F, respectively. Each task is associated with a task owner who is responsible for completing the task. Task thread 500 indicates that task A is a definite starting point and task F is the end point of the workflow. Task F also indicates the point at which verification for closing the loop takes place. Task thread 500 includes only one-to-one dependencies between tasks. Each task in task thread 500 is associated with a predefined time period for initiation and completion of the task. The predefined time periods are structured so that task B starts only after task A is completed, task C starts only after task B is completed, etc. Escalation occurs at each step of the workflow represented by task thread 500 if the step's task is not completed in the predefined time period associated with the task or if the task owner does not respond to an inquiry about the task's status within another predefined period of time.

As one example, task B of task thread 500 can be applied to the information gathering process of FIG. 4. In this example, task B is obtained in step 406 (see FIG. 4), the time period for completing task B has expired, and the task owner associated with task B is notified with an instant message in step 408 (see FIG. 4), where the instant message asks the task owner whether task B is complete in step 410 (see FIG. 4). In this example, the task owner's response to the instant message query indicates the status of task B, thereby allowing step 412 (see FIG. 4) to determine that task B is incomplete. Since the time period for completing task B has expired, step 414 (see FIG. 4) determines that escalation is necessary. That is, step 414 (see FIG. 4) determines that a project manager associated with task B and the task owner is to be notified. In step 416 (see FIG. 4), the project manager is notified of task B being incomplete via an instant message sent from backend process 116 (see FIG. 1) to a client computing unit being used by the project manager.

FIG. 5A serves as an example of a task thread that can be applied to the information gathering processes of the present invention, but those skilled in the art will recognize that other configurations of tasks with one-to-one dependencies are possible. For instance, the task thread may have any number of tasks and task owners, as long as there are at least two tasks and at least two task owners.

Figure 5B:
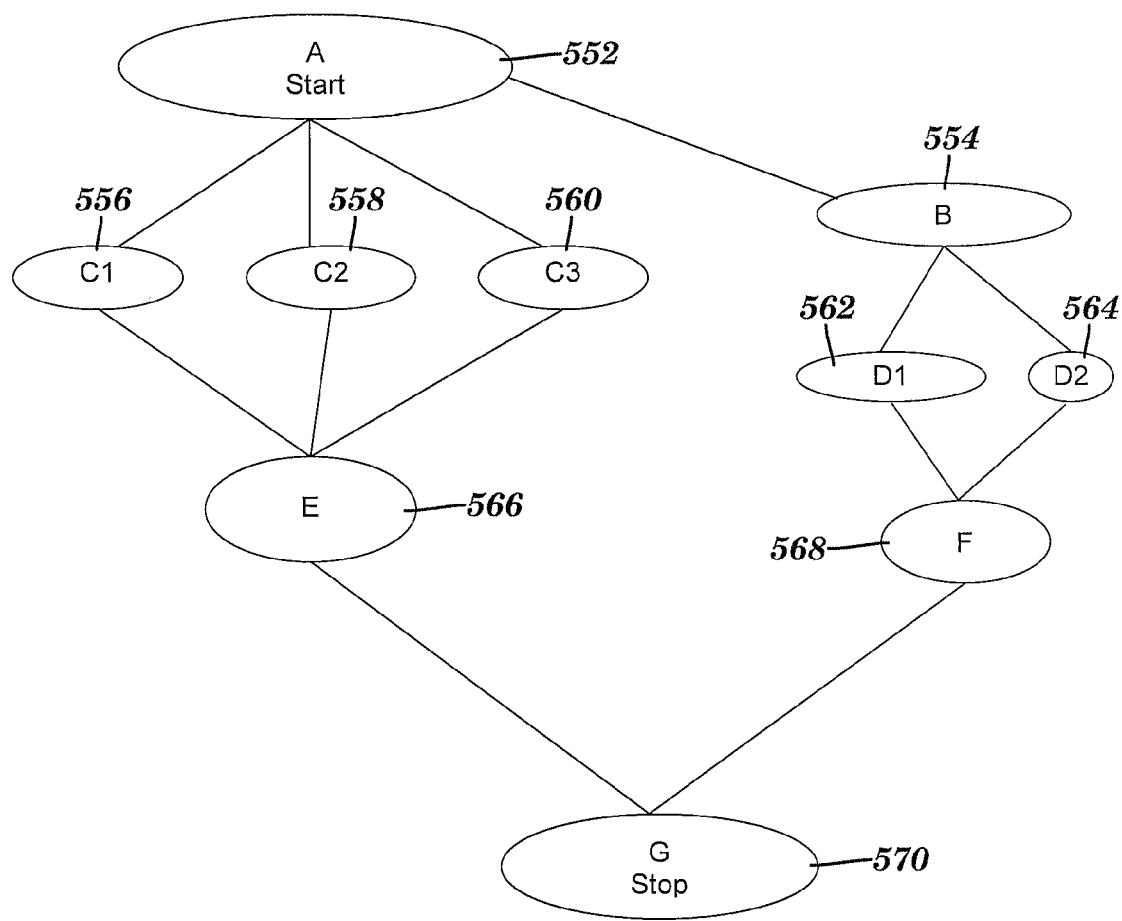
FIG. 5B depicts an example of a one-to-many dependency task thread of a workflow whose management is facilitated by the system of FIG. 1, and at least one of the processes of FIGS. 2-4, in accordance with embodiments of the present invention.

FIG. 5B depicts an example of a one-to-many dependency task thread of a workflow whose management is facilitated by the system of FIG. 1, in accordance with embodiments of the present invention. Task thread 550 includes predefined tasks 552, 554, 556, 558, 560, 562, 564, 566, 568 and 570, which are also labeled as tasks A through G, respectively. Each task is associated with a task owner who is responsible for completing the task. Task thread 550 indicates that task A is a definite starting point and task G is the end point of the workflow. Task G also indicates the point in the workflow at which verification for closing the loop takes place. Task thread 550 includes one-to-many dependencies between tasks (e.g., from task A to task A's child tasks B, C1, C2 and C3). Each task in task thread 500 is associated with a predefined time period for initiation and completion of the task. The predefined time periods are structured so that tasks B, C1, C2 and C3 start only after task A is completed, task E starts only after tasks C1, C2 and C3 are completed, tasks D1 and D2 start only after task B is completed, task F starts only after tasks D1 and D2 are completed, and task G starts only after tasks E and F are completed. Escalation occurs at each step of the workflow represented by task thread 550 if the step's task is not completed in the predefined time period associated with the task or if the task owner does not respond to an inquiry about the task's status within another predefined period of time.

As one example, task E of task thread 550 can be applied to the information gathering process of FIG. 4. In this example, step 404 (see FIG. 4) marks tasks C1, C2 and C3 as being complete, task E is obtained in step 406 (see FIG. 4), the time period for completing task E has expired, and the task owner associated with task E is notified with an instant message in step 408 (see FIG. 4), where the instant message asks the task owner whether task E is complete in step 410 (see FIG. 4). In this example relative to FIG. 5B, the task owner's response to the instant message query indicates the status of task E, thereby allowing step 412 (see FIG. 4) to determine that task E is incomplete. Since task E is incomplete and the time period for completing task E has expired, step 414 (see FIG. 4) determines that escalation is necessary. That is, step 414 (see FIG. 4) determines that a project manager associated with task E and the task owner is to be notified. In step 416 (see FIG. 4), the project manager is notified of task E being incomplete via an instant message sent from backend process 116 (see FIG. 1) to a client computing unit being used by the project manager.

FIG. 5B serves as an example of a task thread that can be applied to the information gathering processes of the present invention, but those skilled in the art will recognize that other numbers of tasks may be included in the task thread and other configurations of tasks with one-to-many dependencies are possible.

The workflow-related processes and task threads of FIGS. 4, 5A and 5B are only examples. The information gathering capabilities of the present invention can be used in other environments, such as ticketing management systems, server management systems, application management, remote and global real-time collaborations, and in systems that generate metrics for response time measurements (e.g., user response times) and service level attainments.

Computing System

Figure 6:
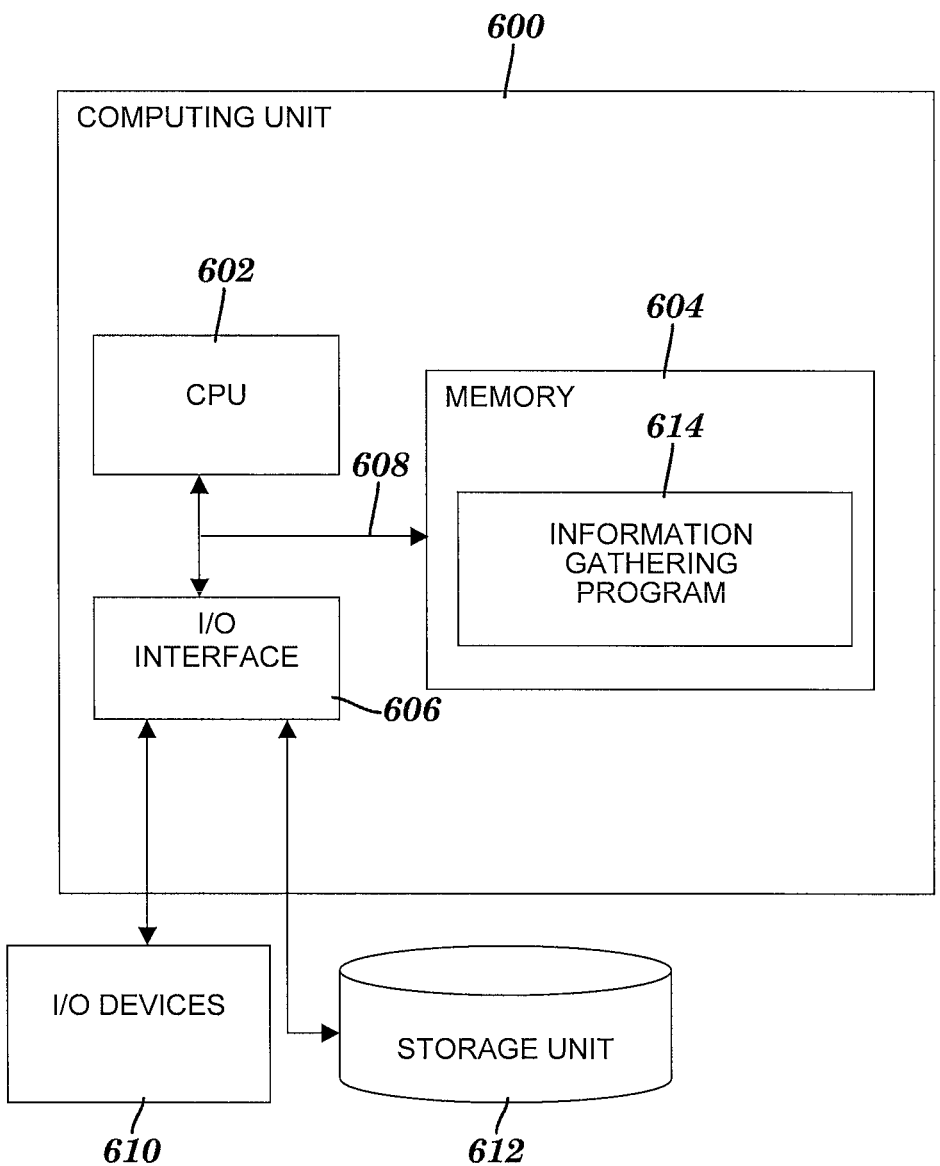
FIG. 6 is a block diagram of a computing unit that is included in the system of FIG. 1 and that implements the processes of FIGS. 2-4, in accordance with embodiments of the present invention.

FIG. 6 is a block diagram of a backend computing unit that is included in the system of FIG. 1 and that implements the processes of FIGS. 2-4, in accordance with embodiments of the present invention. Computing unit 600 generally comprises a central processing unit (CPU) 602, a memory 604, an input/output (I/O) interface 606, a bus 608, I/O devices 610 and a storage unit 612. CPU 602 performs computation and control functions of computing unit 600. CPU 602 may comprise a single processing unit, or be distributed across one or more processing units in one or more locations (e.g., on a client and server).

Memory 604 may comprise any known type of data storage media, including bulk storage, magnetic media, optical media, random access memory (RAM), read-only memory (ROM), a data cache, a data object, etc. Cache memory elements of memory 604 provide temporary storage of at least some program code (e.g., information gathering program 614) in order to reduce the number of times code must be retrieved from bulk storage during execution. Moreover, similar to CPU 602, memory 604 may reside at a single physical location, comprising one or more types of data storage, or be distributed across a plurality of physical systems in various forms. Further, memory 604 can include data distributed across, for example, a LAN, WAN or storage area network (SAN) (not shown).

I/O interface 606 comprises any system for exchanging information to or from an external source. I/O devices 610 comprise any known type of external device, including a display monitor, keyboard, mouse, printer, speakers, handheld device, printer, facsimile, etc. Bus 608 provides a communication link between each of the components in computing system 600, and may comprise any type of transmission link, including electrical, optical, wireless, etc.

I/O interface 606 also allows computing system 600 to store and retrieve information (e.g., program instructions or data) from an auxiliary storage device 612. The auxiliary storage device may be a non-volatile storage device such as a magnetic disk drive or an optical disk drive (e.g., a CD-ROM drive which receives a CD-ROM disk). Computing system 600 can store and retrieve information from other auxiliary storage devices (not shown), which can include a direct access storage device (DASD) (e.g., hard disk or floppy diskette), a magneto-optical disk drive, a tape drive, or a wireless communication device. In one embodiment, one of the auxiliary storage devices described above includes data repository 118 (see FIG. 1).

Memory 604 includes information gathering program 614 for using an instant messaging system to gather information for backend process 116 (see FIG. 1). Information gathering program 614 implements steps executed by backend process 116 (see FIG. 1) in one or more of the processes of FIGS. 2-4. Further, memory 604 may include other systems not shown in FIG. 6, such as an operating system (e.g., Linux) that runs on CPU 602 and provides control of various components within and/or connected to computing system 600.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of information gathering program 614 for using an instant messaging system to gather information for backend process 116 (see FIG. 1) for use by or in connection with a computing system 600 or any instruction execution system to provide and facilitate the capabilities of the present invention. For the purposes of this description, a computer-usable or computer-readable medium can be any apparatus that can store the program for use by or in connection with the instruction execution system, apparatus, or device. The term "computer-readable storage device" does not include signal propagation media such as a copper transmission cable, an optical transmission fiber or a wireless transmission media.

The medium can be an electronic, magnetic, optical, electromagnetic, infrared, or semiconductor system (or apparatus or device). Examples of a computer-readable medium include a semiconductor or solid state memory, magnetic tape, a removable computer diskette, RAM 604, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the present invention's process for using an instant messaging system to gather information for backend process 116 (see FIG. 1). Thus, the present invention discloses a process for supporting computer infrastructure, comprising integrating, hosting, maintaining and deploying computer-readable code into a computing system (e.g., computing system 600), wherein the code in combination with the computing system is capable of performing a method of using an instant messaging system to gather information for backend process 116 (see FIG. 1).

In another embodiment, the invention provides a business method that performs the process steps of the invention on a subscription, advertising and/or fee basis. That is, a service provider, such as a Solution Integrator, can offer to create, maintain, support, etc. a process of the present invention that includes using an instant messaging system to gather information for backend process 116 (see FIG. 1). In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing a workflow using an instant messaging system to gather information about statuses of tasks included in the workflow, the method comprising:
   a server computer generating a first query that requests from a user a first status of a first task of the workflow;
   the server computer sending a first instant message that includes the first query to a first client computer via an instant message server that provides an instant messaging service to the first client computer;
   in real-time and via the instant message server, the server computer receiving from the first client computer a second instant message that includes one or more key words entered into the second instant message by the user, the one or more key words indicating the first status in response to the first query;
   the server computer determining that the first task is complete based on the one or more key words included in the second instant message and that the first task is required to be complete before a second task of the workflow is started;
   based in part on the one or more key words being included in the second instant message, the server computer automatically generating a second query that requests a second status of the second task of the workflow;
   the server computer sending a third instant message that includes the second query to a second client computer via an instant message server that provides an instant messaging service to the second client computer;
   the server computer receiving from the second client computer a fourth instant message that includes a second response to the second query; and
   the server computer determining that the second task is complete based on the one or more key words included in the second response.

2. The method of claim 1, further comprising:
   prior to the step of receiving the second instant message, the server computer receiving from the first client computer an initial instant message that includes an initial response to the first query;
   the server computer determining that the first task is not complete based on the initial response not including the one or more key words;
   the server computer determining that the initial response includes an indication of a time period to wait before sending a subsequent instant message to the first client computer that includes the first query; and
   the server computer determining the time period has elapsed and in response, the server computer sending to the first client computer the subsequent instant message that includes the first query.

3. The method of claim 1, further comprising:
   prior to the step of receiving the second instant message, the server computer receiving from the first client computer an initial instant message that includes an initial response to the first query;
   the server computer determining that the initial response indicates an end user who is assigned to complete the first task has not completed the first task within a predetermined time period for completing the first task; and
   the server computer sending an escalation instant message via an instant message server notifying an escalation person associated with the end user about the first task not being completed by the end user within the predetermined time period.

4. The method of claim 1, further comprising:
   prior to the step of receiving the second instant message, the server computer receiving from the first client computer an initial instant message that includes a notification that an end user who is assigned to complete the first task is not available to provide the first status;
   the server computer determining that the end user is unavailable to provide the first status to the server computer based on the notification included in the initial instant message; and
   in response to the step of determining that the end user is unavailable, the server computer sending an escalation instant message via an instant message server notifying an escalation person associated with the end user about the end user being unavailable to provide the first status.

5. The method of claim 1, further comprising:
   subsequent to the step of determining that the second task is complete based on the one or more key words included in the second response, the server computer recording that the second task is complete;
   the server computer determining the workflow includes a third task whose start is required to be subsequent to a completion of the second task;
   the server computer determining a user who is assigned to complete the third task; and
   subsequent to the step of determining that the second task is complete based on the one or more key words included in the second response, the server computer sending an instant message asking the user who is assigned to complete the third task whether the third task is completed.

6. A computer system for managing a workflow using an instant messaging system to gather information about statuses of tasks included in the workflow, the computer system comprising:
   a CPU;
   a computer-readable memory;
   a computer-readable storage device;
   first program instructions to automatically generate a first query that requests from a user a first status of a first task of the workflow;
   second program instructions to send a first instant message that includes the first query to a first client computer via an instant message server that provides an instant messaging service to the first client computer;
   third program instructions to receive, in real-time and from the first client computer via the instant message server, a second instant message that includes one or more key words entered into the second instant message by the user, the one or more key words indicating the first status in response to the first query;
   fourth program instructions to determine that the first task is complete based on the one or more key words included in the second instant message and that the first task is required to be complete before a second task of the workflow is started, and based in part on the one or more key words being included in the second instant message, to automatically generate a second query that requests a second status of the second task of the workflow;
   fifth program instructions to send a third instant message that includes the second query to a second client computer via an instant message server that provides an instant messaging service to the second client computer;

sixth program instructions to receive from the second client computer a fourth instant message that includes a second response to the second query; and
seventh program instructions to determine that the second task is complete based on the one or more key words included in the second response,
wherein the first through seventh program instructions are stored on the computer-readable storage device for execution by the CPU via the computer-readable memory.

7. The computer system of claim 6, further comprising:
eighth program instructions to receive from the first client computer an initial instant message that includes an initial response to the first query prior to receiving the second instant message by the third program instructions;
ninth program instructions to determine that the first task is not complete based on the initial response not including the one or more key words;
tenth program instructions to determine that the initial response includes an indication of a time period to wait before sending a subsequent instant message to the first client computer that includes the first query; and
eleventh program instructions to determine the time period has elapsed and in response, to send to the first client computer the subsequent instant message that includes the first query,
wherein the eighth, ninth, tenth and eleventh program instructions are stored on the computer-readable storage device for execution by the CPU via the computer-readable memory.

8. The system of claim 6, further comprising:
eighth program instructions to receive from the first client computer an initial instant message that includes an initial response to the first query prior to receiving the second instant message by the third program instructions;
ninth program instructions to determine that the initial response indicates an end user who is assigned to complete the first task has not completed the first task within a predetermined time period for completing the first task; and
tenth program instructions to send an escalation instant message via an instant message server notifying an escalation person associated with the end user about the first task not being completed by the end user within the predetermined time period,
wherein the eighth, ninth and tenth program instructions are stored on the computer-readable storage device for execution by the CPU via the computer-readable memory.

9. The system of claim 6, further comprising:
eighth program instructions to receive, prior to receiving the second instant message by the third program instructions, an initial instant message from the first client computer, the initial instant message including a notification that an end user who is assigned to complete the first task is not available to provide the first status;
ninth program instructions to determine that the end user is unavailable to provide the first status based on the notification included in the initial instant message; and
tenth program instructions to send, in response to determining that the end user is unavailable by the ninth program instructions, an escalation instant message via an instant message server notifying an escalation person associated with the end user about the end user being unavailable to provide the first status,
wherein the eighth, ninth and tenth program instructions are stored on the computer-readable storage device for execution by the CPU via the computer-readable memory.

10. The system of claim 6, further comprising:
eighth program instructions to record, subsequent to determining that the second task is complete based on the one or more key words included in the second response by an execution of the seventh program instructions, that the second task is complete;
ninth program instructions to determine the workflow includes a third task whose start is required to be subsequent to a completion of the second task;
tenth program instructions to determine a user who is assigned to complete the third task; and
eleventh program instructions to send, subsequent to determining that the second task is complete based on the one or more key words included in the second response by an execution of the seventh program instructions, an instant message asking the user who is assigned to complete the third task whether the third task is completed,
wherein the eighth, ninth, tenth and eleventh program instructions are stored on the computer-readable storage device for execution by the CPU via the computer-readable memory.

11. A computer program product comprising computer-readable storage device(s) and computer-readable program instructions stored on the computer-readable storage device(s) to manage a workflow using an instant messaging system to gather information about statuses of tasks included in the workflow, the computer-readable program instructions, when executed by a CPU:
automatically generate a first query that requests from a user a first status of a first task of the workflow;
send a first instant message that includes the first query to a first client computer via an instant message server that provides an instant messaging service to the first client computer;
receive in real-time and from the first client computer via the instant message server, a second instant message that includes one or more key words entered into the second instant message by the user, the one or more key words indicating the first status in response to the first query;
determine that the first task is complete based on the one or more key words included in the second instant message and that the first task is required to be complete before a second task of the workflow is started;
based in part on the one or more key words being included in the second instant message, automatically generate a second query that requests a second status of the second task of the workflow;
send a third instant message that includes the second query to a second client computer via an instant message server that provides an instant messaging service to the second client computer;
receive from the second client computer a fourth instant message that includes a second response to the second query; and
determine that the second task is complete based on the one or more key words included in the second response.

12. The program product of claim 11, wherein the computer-readable program instructions, when executed by the CPU:
receive from the first client computer an initial instant message that includes an initial response to the first query prior to the computer-readable program instructions executed to receive the second instant message;

determine that the first task is not complete based on the initial response not including the one or more key words;

determine that the initial response includes an indication of a time period to wait before sending a subsequent instant message to the first client computer that includes the first query;

determine the time period has elapsed and in response, send to the first client computer the subsequent instant message that includes the first query.

13. The program product of claim 11, wherein the computer-readable program instructions, when executed by the CPU:

subsequent to a determination by an execution of the program instructions that the second task is complete based on the one or more key words included in the second response, record that the second task is complete;

determine the workflow includes a third task whose start is required to be subsequent to a completion of the second task;

determine a user who is assigned to complete the third task; and subsequent to the determination by the execution of the program instructions that the second task is complete based on the one or more key words included in the second response, send an instant message asking the user who is assigned to complete the third task whether the third task is completed.

* * * * *